Figure 1:
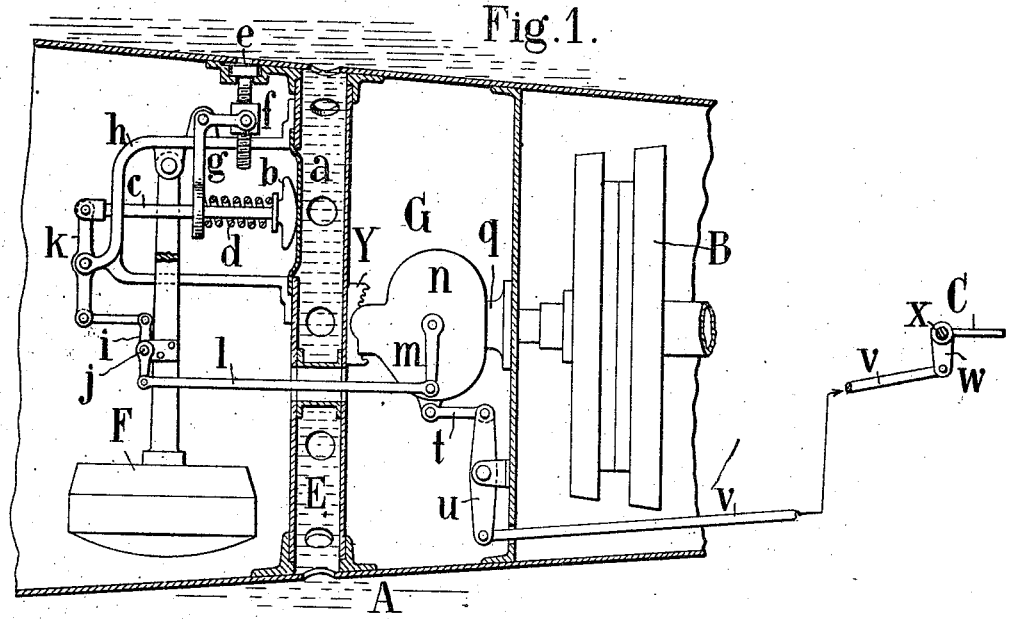

F. M. LEAVITT.
DIVING GEAR FOR SUBMARINE BOATS.
APPLICATION FILED MAY 22, 1907.

933,083.

Patented Sept. 7, 1909.
4 SHEETS—SHEET 1.

WITNESSES:

INVENTOR:
Frank M. Leavitt,
By Attorneys,

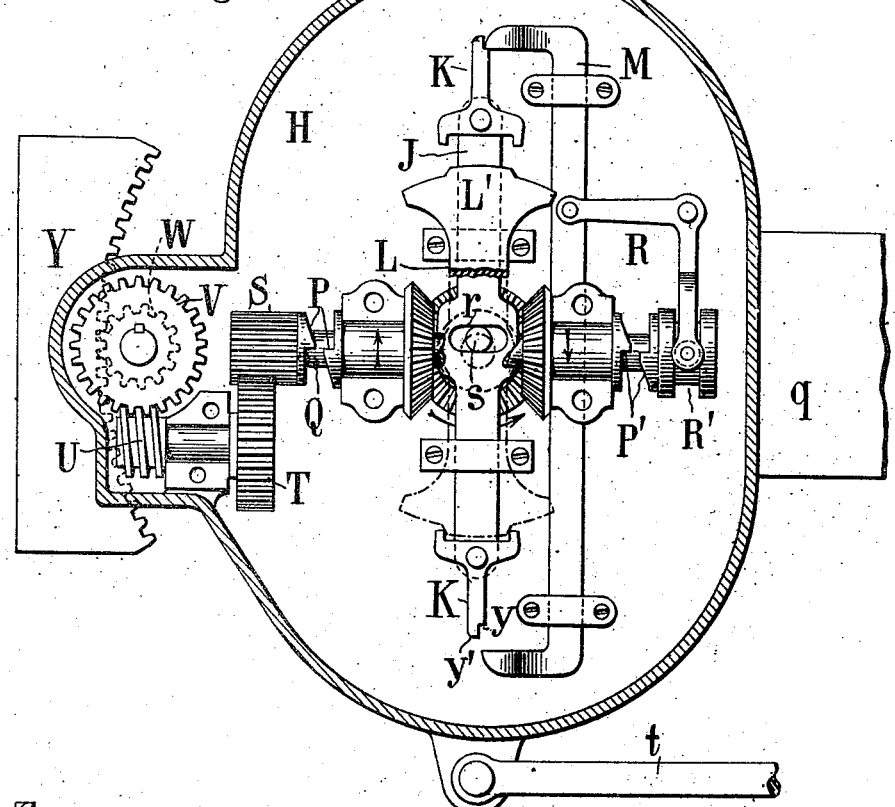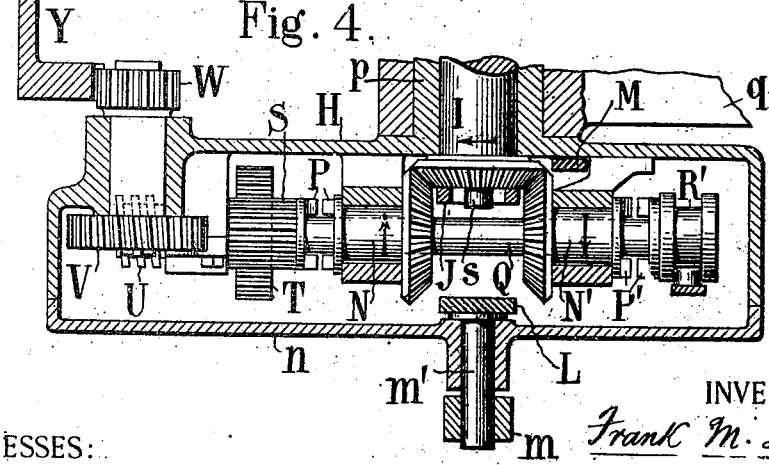

F. M. LEAVITT.
DIVING GEAR FOR SUBMARINE BOATS.
APPLICATION FILED MAY 22, 1907.

933,083.

Patented Sept. 7, 1909.
4 SHEETS—SHEET 4.

UNITED STATES PATENT OFFICE.

FRANK M. LEAVITT, OF NEW YORK, N. Y., ASSIGNOR TO E. W. BLISS COMPANY, OF BROOKLYN, NEW YORK, A CORPORATION OF WEST VIRGINIA.

DIVING-GEAR FOR SUBMARINE BOATS.

933,083.  Specification of Letters Patent. Patented Sept. 7, 1909.

Application filed May 22, 1907. Serial No. 375,074.

*To all whom it may concern:*

Be it known that I, FRANK M. LEAVITT, a citizen of the United States, residing in the borough of Brooklyn, county of Kings, city and State of New York, have invented certain new and useful Improvements in Diving-Gear for Submarine Boats, of which the following is a specification.

This invention provides a so-called diving gear or immersion mechanism for automatically maintaining a submarine vessel, such for example as an automobile torpedo, at a prescribed depth beneath the surface. Such an immersion mechanism comprises controlling means such as a hydrostat, a steering apparatus controlled thereby, and a rudder turning upon a horizontal axis operated by such steering mechanism. In the Whitehead torpedo the controlling means combines a hydrostatic diaphragm and a pendulum; these operate the floating valve of a fluid-actuated steering engine; and the piston or plunger of this engine is connected to the tiller of the diving rudder.

The present invention provides a mechanically-operated steering mechanism adapted to be controlled with the utmost sensitiveness, and adapted to exert a powerful force for operating the rudder. It dispenses with the fluid pressure steering engine heretofore used.

The steering mechanism comprises a movable controlling or pilot part which may take the form of an oscillatory disk or cam, and which is moved by the hydrostatic controlling means; an impression device or feeler which may take the form of a light dog or pallet, and which moves rapidly toward and from such cam, coming lightly into touch therewith so as to be positioned thereby, and then receding therefrom so that according to its position it may or may not encounter an actuated part or tappet, which it is able to displace without any reaction against the controlling part, and with a force limited only by the source of power which reciprocates it; a power-controlling device applied, according to the position of such actuated part or tappet, to determine the application of power from any suitable source to move in either direction a driven part which may take the form of an oscillating carrier; and a connection from such driven part to the rudder whereby the power is applied to turn the rudder. This mechanism is susceptible of control without appreciable reactive thrust, so that a very weak, feeble, or sensitive controlling device may effectively govern the steering operation. It also enables the utilization of an ample power, such for example as that taken from the propelling engine, for operating the rudder. It provides for instantaneous control of the rudder, the movements of which follow immediately after those communicated by the controlling means.

Figure 2:
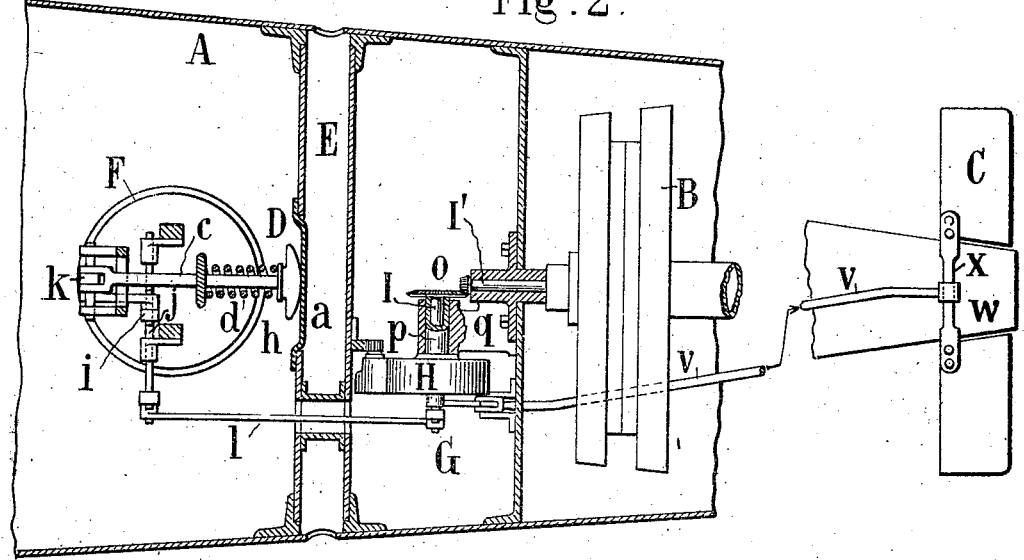
Figure 5:
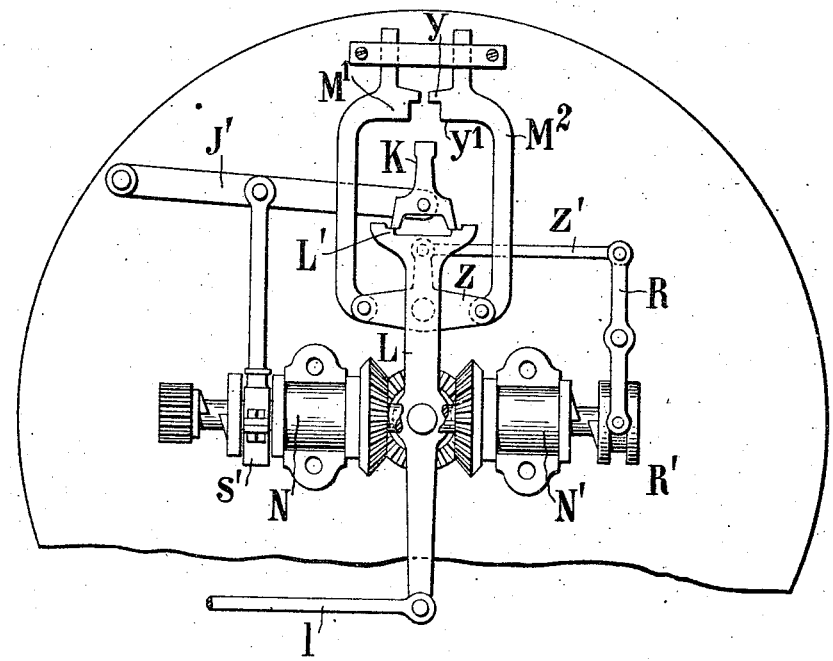
Figure 6:
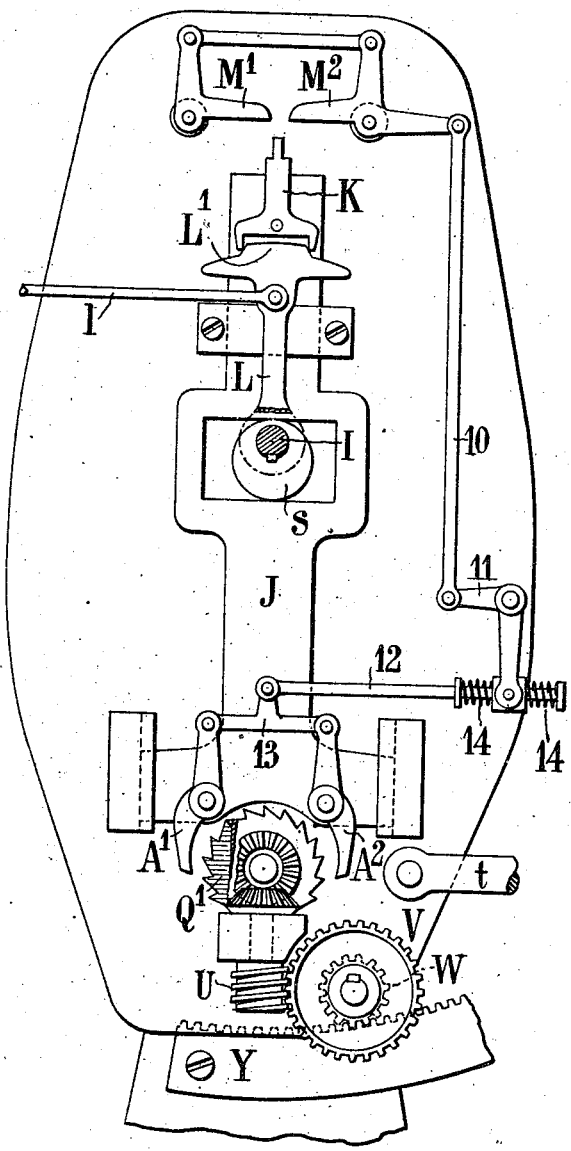

Figure 1 of the accompanying drawings is a vertical section through a portion of the hull of a torpedo showing the mechanism partly in elevation; Fig. 2 is a horizontal section thereof; Fig. 3 is a vertical section on a larger scale of the steering mechanism; Fig. 4 is a horizontal section thereof. Figs. 5 and 6 are elevations showing modifications of the steering mechanism.

Referring to the drawings, let A indicate the hull of the torpedo or other submarine boat, of which B is the propelling engine (here shown as a turbine), and C is the horizontal rudder, otherwise called the diving rudder or immersion rudder. This rudder is usually divided, forming two fins or sections on the rudder shaft, as shown in Fig. 2.

D is the hydrostat, usually constructed as a diaphragm $a$, which receives on one side the water pressure in a chamber or compartment E between two bulkheads.

F is the usual pendulum coöperating with the hydrostat for controlling the steering means.

G is the steering mechanism as a whole.

As shown, the hydrostat and pendulum and their connections are of usual construction. The diaphragm $a$ receives through a head $b$ and rod $c$ the pressure of a spring $d$. This spring is adjustable by a screw $e$ engaging a nut $f$ and elbow-lever $g$ against which the spring reacts. The pendulum F is hung from a frame or support $h$ and carries an equalizing lever $i$, the two arms of which are fixed on a shaft $j$ hung in bearings on the pendulum. The upper arm connects with the rod $c$ by a lever $k$ turning on a fixed fulcrum; the lower arm connects by a rod $l$ with the controlling or pilot part of the steering mechanism G.

The steering mechanism G is shown with its working parts mainly inclosed in a shell or casing $n$, but this is not essential. The mechanism comprises a movable driven part or carrier H, which may be any suitable oscillatory frame or disk, and which has a hub $p$ adapted to turn in a bearing formed in a supporting frame $q$. Within this hub $p$ turns a power-driven shaft I. This shaft I is rotated constantly by power taken from any suitable source, preferably the propelling engine B. In Fig. 2 this engine is shown with a shaft I', which through bevel gears $o$ drives the shaft I.

The function of the steering mechanism is to direct the application of the power derived from the shaft I to turn the rudder. The steering mechanism is controlled by a controlling or pilot part L which is moved by the hydrostat through the rod $l$; the part L is shown as an oscillatable part or mutilated disk, fastened (by welding or otherwise) on a short shaft $m'$ passing through a bearing in the front of the casing $n$, and having fixed on its outer end (as by a set-screw) an arm $m$ to which the rod $l$ connects, so that the movements of this rod are communicated to the part L.

The pilot part L is adapted to act upon an impression-device, by which its movements are communicated without any appreciable reactive thrust, to the power-controlling means. To this end the part L is formed with a cam L', and the impression-device is preferably a light reciprocating dog or "feeler" K. The parts L and K are preferably duplicated as shown, the lower cam being shown in dotted lines in Fig. 3. For reciprocating the feelers K they may be carried on any suitable reciprocating part by which each feeler is moved rapidly toward and from its cam L'. The feeler approaches the cam with a gentle touch, so that it receives an upright or tilted position according to whether the cam is central or displaced; and the movement is so rapid that in receding the feeler cannot lose the position thus impressed upon it. For thus reciprocating the feelers they are shown as carried on a slide J mounted on the carrier H and reciprocated by suitable power, preferably that taken from the same driving shaft I. The slide is shown as formed with a transverse slot $r$ engaged by a crank $s$ on the shaft I.

The feelers K K in their movement away from their respective cams engage an actuated part M in the nature of a tappet, and the movements of which control the application of power to turn the carrier H in one direction or the other. This part or tappet M is shown as a slide, carried by the carrier H. The power is conveniently applied through right and left gearing engaged with a driven shaft through clutches, but other means may be substituted. For this purpose the driving shaft I carries a miter-gear which imparts opposite rotation to like gears on hollow shafts N and N', which turn constantly in opposite directions and carry clutches P and P' respectively, by which to engage either of them separately with a propelling mechanism which in turn moves the carrier H. As shown, this mechanism comprises a shaft Q passing through the hollow shafts N N'. To apply the clutches, the slide M is connected to the shaft Q to move it endwise. The connection shown is by means of an elbow-lever R engaging a collar R' fixed on the shaft. Thus in its middle position the shaft Q is stationary, but when displaced toward either side it is driven in one direction or the other. It carries a pinion S which through any suitable train of gearing (such as a gear T, worm U and worm-wheel V) drives a pinion W which engages a fixed rack Y. Thus the rotation imparted to the shaft Q is communicated (at usually a reduced speed) to the pinion W, which travels along the rack Y and carries with it the carrier H, which is thus turned slowly in one direction or the other. The carrier is turned in such direction as to follow the movement previously imparted to the pilot L. Its movement continues until it has been displaced through the same angle as the pilot cam, or in other words until it overtakes the cam; thereupon the feelers K are brought by the cam to their normal position and the slide M is restored to its normal or middle position, thereby disconnecting the clutch and stopping the rotation of the shaft Q, so that the carrier stops.

The rudder is connected in any suitable way to the carrier, so that the movements of the carrier are imparted to the rudder. When the carrier is in its normal or central position, the rudder is directed in an axial plane; when the carrier is displaced to either side, the rudder is correspondingly turned either upward or downward, that is to say in the proper direction to steer the torpedo or other submarine boat toward the prescribed depth. The connection shown consists of a link $t$, lever $u$, and connecting rod $v$, which latter connects to the tiller $w$, which is shown as an arm fixed to the rudder shaft $x$.

The operation will now be described. Assuming first that the vessel is running on an even keel and at the prescribed depth, the parts are in the position shown in the drawing; that is to say the hydrostat is in equilibrium, the stress of its spring $d$ balancing the water pressure, the pendulum hangs vertically, the pilot L slide M and shaft Q are in central positions, the carrier H is stationary, and the rudder is in the plane of the axis. If for example the craft should run too deep, the increase in hydrostatic pressure would overcome the spring $d$, and the resulting movement of the diaphragm would be communicated through the parts $c$, $k$, $i$, $l$, $m$, to the pilot L. The angular displacement of the pilot cam serves to tilt the feeler K at the next movement of the latter toward it. According to the direction to which this feeler is tilted it imparts on its receding movement a displacement to the slide M, which through the lever R is communicated to the shaft Q, and the latter is clutched to one or other of the oppositely revolving shafts N N', whereby through the train of gearing the pinion W is turned so that it carries with it the carrier H, and hence through the connections $t$, $u$, $v$, turns the rudder, tilting the latter upwardly so that it checks the downward course of the craft and steers it in an ascending course. As soon as the carrier H has been displaced to the same extent as the first displacement of the pilot L, the feeler K is restored to central position and restores the slide M, and the train of gearing is stopped, thereby arresting the carrier and the rudder after an inclination has been imparted to the latter which corresponds to the original displacement of the hydrostat. As the submarine craft steers upwardly the hydrostatic pressure diminishes, so that the spring $d$ moves back the diaphragm and there results a contrary motion of the pilot L, which in turn sets the steering mechanism in operation in the contrary direction until the carrier H again overtakes the displacement of the pilot L, whereupon it again stops; during this return movement the rudder C is restored to its former position. If the vessel rises above the prescribed depth, the contrary series of operations is performed. The movements are modified by the action of the pendulum F which carries the fulcrum of the lever $i$, so that the movements of the cam are the resultants of the combined movements of the hydrostat and pendulum, according to the manner which is well understood with reference to the immersion gear of the Whitehead torpedo.

The impression device or sensitive directive means herein described comprising the light reciprocating feeler K moving rapidly toward and from a cam L' on a controlling part, and in its receding movement striking a tappet part M, is in principle essentially the same as that set forth in United States Patent No. 795,045, granted July 18, 1905. In order to restore the tappet or slide M to its mid-position, each of the feelers K is provided with two tappet shoulders $y$ and $y'$; the shoulders $y$ encounter the tappet when the feelers are in the normal or mid-position, and are so placed as to move the tappet from either extreme position to the mid-position; the shoulders $y'$ are arranged sufficiently in advance so that upon striking the tappet they will displace it from its mid-position to one or other of its extreme positions. This feature generally is set forth in my pending application No. 363,394, filed March 20, 1907.

The steering mechanism may be variously modified within the principle of the present invention. For example the means for applying power and for controlling its application may be greatly varied.

In Fig. 5 is shown a modification in which the pilot part L has but one cam and there is but one feeler K which acts upon two tappet parts or slides $M^1$ $M^2$ which are connected to move in opposite directions through the medium of a lever Z, which lever has an upright arm connecting by a rod Z' with the lever R which engages the clutch collar R'. Instead of the feeler K having two successive shoulders, these shoulders $y$ $y'$ are formed on the tappets $M^1$ $M^2$ so as to operate in like manner. The cam L' is shown as an inversely stepped cam. The feeler K instead of being carried on a reciprocating slide, is carried on a lever J' which is reciprocated from an eccentric $s'$ on a continuously revolving shaft N. Otherwise the construction is the same as that first described.

Another modification is shown in Fig. 6, where also the pilot L has only a single cam acting on a single feeler. This feeler is carried as in the first instance on a reciprocating slide J, which as before is reciprocated by an eccentric $s$ on the driving shaft I. This slide also serves as the means for communicating power to the propelling mechanism by means of a ratchet and pawl device. To this end the slide carries pawls $A^1$ $A^2$ which are normally out of engagement with a double acting ratchet wheel $Q^1$, (which may as shown consist of two ratchets with oppositely-directed teeth) which connects through miter gears to the worm U, which through a train of gearing as before drives the pinion W which meshes with the rack Y. Both pawls are normally out of engagement with the ratchets and so continue as long as the feeler occupies its normal central position, so that the two tappets $M^1$ $M^2$ remain untilted; but upon the turning of the feeler so that it tilts either tappet, this movement is communicated through their connecting rod to the other, and through any suitable connecting mechanism to the pawls to throw one of them into engagement with its ratchet wheel and thereby turn the train of gearing in the corresponding direction. The intercommunicating parts shown are a rod 10, lever 11, rod 12 and link 13, springs 14, 14 being introduced to allow for the movement of the pawls in clicking over the ratchet teeth. The operation is essentially the same as with the construction first described, differing therefrom only that the movement imparted to the carrier and thence to the rudder is intermittent instead of continuous.

The details and general arrangement of mechanism may be greatly varied without departing from the invention, the essential features of which will be set forth in the claims. It is not strictly essential, although preferable, that the steering mechanism shall be in the nature of a follow-up mechanism so-called wherein a driven part or traveler is controlled by and follows the movements of a controlling or pilot part so as to automatically stop after a displacement which corresponds to that of the pilot part; this in the described construction is accomplished by having the part J or J' carry the feeler K, itself carried by the carrier H, so that as the latter is displaced the path of reciprocation of the feeler is correspondingly displaced.

I claim as my invention:—

1. A diving gear comprising hydrostatic controlling means, a source of power, a rudder, and an interposed steering mechanism comprising a power-controlling device, controlled from said hydrostatic means, and a driven part connected to the rudder and propelled progressively by said power in either direction under control of said power-controlling device.

2. A diving gear comprising hydrostatic controlling means, a pilot part moved thereby, a source of power, a rudder, and an interposed steering mechanism comprising an impression-device adapted to be positioned by said pilot part, a tappet displaced by said impression-device, a power-controlling device actuated by said tappet to control said power, and a driven part moved progressively in either direction by said power and connected to the rudder.

3. A diving gear comprising hydrostatic controlling means, a pilot part moved thereby, a source of power, a rudder, and an interposed steering mechanism comprising a reciprocating feeler moving toward and from said pilot part, a tappet moved by said feeler, a power-controlling device actuated by said tappet to control said power, and a driven part moved progressively in either direction by said power and connected to the rudder.

4. A diving gear comprising hydrostatic controlling means, a pilot part moved thereby, a source of power, a rudder, and an interposed steering mechanism comprising an impression-device adapted to be positioned by said pilot part, a driven part or carrier moved progressively in either direction from said source of power carrying said impression-device and itself connected to the rudder, and a power-controlling device actuated under control of said impression device to control the application of power to said driven part.

5. A diving gear comprising hydrostatic controlling means, a pilot part moved thereby, a source of power, a rudder, and an interposed steering mechanism comprising a reciprocating feeler moving toward and from said pilot part, a tappet moved by said feeler, a power-controlling device actuated by said tappet to control said power, and a driven part carrying said reciprocating feeler and moved progressively in either direction by said power and connected to the rudder.

6. A diving gear comprising hydrostatic controlling means, a pilot part moved thereby, a source of power, a rudder, and an interposed steering mechanism comprising a driven part or carrier connected to the rudder, a reciprocating feeler carried by said carrier and moving toward and from said pilot part, a tappet moved by said feeler and carried by said carrier, and a power-controlling device actuated by said tappet to control said power and thereby to propel said carrier progressively in either direction.

7. In a diving gear, a steering mechanism, a movable pilot part having cams, two feelers each reciprocating toward and from one of said cams, means for reciprocating said feelers, and an actuated part or tappet engaged by said feelers respectively during opposite movements thereof.

8. In a diving gear, a steering mechanism, a movable pilot part, a reciprocating feeler coacting therewith, means for reciprocating said feeler, and an actuated part or tappet engaged by said feeler, said feeler and tappet having reciprocal shoulders adapted in the normal position of the feeler to move the tappet to mid-position, and in a tilted position of the feeler to displace the tappet from mid-position.

9. A steering mechanism comprising a driving shaft, a pilot part movable upon an axis coincident with that of said shaft, a reciprocating part driven by said shaft, a feeler carried thereby coacting with said pilot part, and a tappet arranged to be engaged by said feeler.

10. A steering mechanism comprising a movable pilot part having cams, two feelers each reciprocating toward and from one of said cams, means for reciprocating said feelers, and an actuated part or tappet consisting of a slide having shoulders engaged by said feelers for displacing it in opposite directions.

11. A steering mechanism comprising a driving shaft, a feeler reciprocated from said shaft, a pilot part controlling said feeler, a tappet device actuated by said feeler, a driven part, and propelling means for moving the latter driven from said shaft under control of said tappet part.

12. A steering mechanism comprising a driving shaft, a feeler reciprocated from said shaft, a pilot part controlling said feeler, a tappet device actuated by said feeler, a driven part, and propelling mechanism for driving it under control of said tappet device comprising oppositely rotating parts driven from said shaft, a driven shaft, clutches for engaging the latter with either of said rotating parts operated by said tappet device, and means for imparting motion from said driven shaft to said driven part.

In witness whereof, I have hereunto signed my name in the presence of two subscribing witnesses.

FRANK M. LEAVITT.

Witnesses:
CHARLES E. POLLARD,
FRED. H. MCGAHIE.